(12) United States Patent
Inayoshi

(10) Patent No.: US 7,337,566 B2
(45) Date of Patent: Mar. 4, 2008

(54) AUTOMOTIVE DISPLAY UNIT

(75) Inventor: Shinichi Inayoshi, Nukata-gun (JP)

(73) Assignee: DENSO CORPORATION, Kariya (JP)

( * ) Notice: Subject to any disclaimer, the term of this patent is extended or adjusted under 35 U.S.C. 154(b) by 379 days.

(21) Appl. No.: 11/028,301

(22) Filed: Jan. 4, 2005

(65) Prior Publication Data
US 2005/0180151 A1 Aug. 18, 2005

(30) Foreign Application Priority Data
Feb. 12, 2004 (JP) .............................. 2004-034907

(51) Int. Cl.
*H01K 1/26* (2006.01)
(52) U.S. Cl. .................. 40/593; 40/606.16; 296/24.34
(58) Field of Classification Search ................. 40/591, 40/593, 606.14, 606.15; 701/207, 208, 211, 701/212, 213; 307/9.1, 10.1; 248/27.1, 248/27.3; 296/70, 24.34
See application file for complete search history.

(56) References Cited

U.S. PATENT DOCUMENTS

| | | | | |
|---|---|---|---|---|
| 5,117,511 A | * | 6/1992 | Smith | ........................ 4/114.1 |
| 6,012,785 A | * | 1/2000 | Kawasaki | ..................... 312/29 |
| 6,049,288 A | * | 4/2000 | Kawasaki | ................. 340/815.4 |
| 6,119,060 A | * | 9/2000 | Takayama et al. | ............. 701/36 |
| 6,834,709 B2 | * | 12/2004 | Shirota et al. | ................. 165/43 |

FOREIGN PATENT DOCUMENTS

| | | |
|---|---|---|
| JP | U-2-127543 | 10/1990 |
| JP | A-H04-130525 | 11/1992 |
| JP | A-2002-130092 | 5/2002 |

OTHER PUBLICATIONS

Notification of Reasons for Rejection dated Jul. 11, 2007 in the corresponding Japanese application No. 2004-034907.

* cited by examiner

*Primary Examiner*—Christopher P. Ellis
*Assistant Examiner*—Brian Swenson
(74) *Attorney, Agent, or Firm*—Posz Law Group, PLC

(57) ABSTRACT

A display being installed in a display unit of a automotive vehicle is tiltably fixed on a fixing frame. The frame has a concave portion on its lower member. The concave portion contains a lower end of the display. A drain is disposed in the concave portion in order to drain away a spilt liquid to an outside of a vehicle when the spilt liquid on a surface of the display collects in the concave portion.

5 Claims, 4 Drawing Sheets

AUTOMOTIVE DISPLAY UNIT

CROSS REFERENCE TO RELATED APPLICATION

This application is based on Japanese Patent Application No. 2004-34907 filed on Feb. 12, 2004, the disclosure of which is incorporated herein by reference.

FIELD OF THE INVENTION

The present invention relates generally to automotive display units, and more particularly, to a tiltable display unit configured for draining a liquid on its surface.

BACKGROUND OF THE INVENTION

Many of the automobiles in recent years have a navigation system installed as a driving assistance apparatus. The navigation system displays a road map on a display based on a map data retrieved from a DVD-ROM or the like, having a vehicle position, a path to a destination or the like indicated on the displayed road map. The display of the navigation system uses a liquid crystal display disposed tiltably on a fixing frame. In other words, the display can be tilted in order for a driver of the vehicle to have the best viewing angle in various situations such as adjusting a tilt angle to the height of a driver, avoiding reflection of the sunlight from a window and the like.

The tiltable structure of the display is usually achieved by supporting the top end of the display rotatably on an axis with a torque application mechanism to the display body.

In this type of tiltable structure, a gap can be caused between a lower end of the display and a lower member of the fixing frame when the display is tilted. In a conventional automotive display, the fixing frame of the display has a concave portion at the bottom of the inside area to accommodate the lower end of the display, in order to prevent the gap from being seen from outside.

The navigation system is disposed on a dashboard, typically in the middle of the driver's seat and the passenger's seat. Therefore, the display of the navigation system suffers from a liquid spilt from a cup held by a passenger or a driver when the vehicle stops suddenly.

The spilt liquid collects in the concave portion at a lower inside area of the fixing frame of the display. The collected liquid penetrates into the display. Many electric circuits for the liquid crystal display and the like are disposed in the display, and thus the penetrated liquid causes a short circuit or other damages to the circuit.

Penetration of the spilt liquid into the display can be prevented by devising a drain structure in the concave portion at the bottom of the fixing frame. A patent document JP-A-2002-130092 discloses a groove for draining water in an engine starter including a motor, a speed reduction device, an electromagnetic device, a clutch, and a switch. However, it is difficult to apply the drain structure disclosed in this patent document described above to a display of a navigation system, because of the difference of the mechanism between the starter and the display.

SUMMARY OF THE INVENTION

In view of the above-described problems, it is an object of the present invention to provide a drain structure in a concave portion of the fixing frame of an automotive display unit in a vehicle.

In the present invention, a display unit having a tiltable display in a vehicle includes a fixing frame with a concave portion formed on the lower inside area, and a drain portion for draining a liquid in the concave portion.

According to this structure, the concave portion formed on the lower inside area of the fixing frame to accommodate the lower end of the display drains a spilt liquid, a spillover from a cup such as a drink or the like, through the drain portion to the outside of the display unit. Therefore, the lower end of the display will not be immersed in the liquid collected in the concave portion, and thus the inside of the display is protected from damage caused by the liquid.

In this case, the bottom of the concave portion is formed as an inclined surface towards one side of the bottom, and the drain portion is formed at the lower end of the inclined surface. The spilt liquid flows down the inclined surface in the concave portion and drains away to the drain portion. A gutter may be formed at the lower end of the inclined surface, and may be connected to the drain portion. This structure is more effective for draining the liquid away to the drain portion.

The inclined surface lowers towards the back end of the display unit. The backwardly inclined surface leads to the drain portion disposed at the back of the concave portion, being hidden behind the display. This structure benefits the appearance of the display unit by preventing an exposure of the drain portion.

The display is disposed rotatably on an axis fixed at the upper portion of the fixing frame, and the tilted bottom surface of the concave portion has an elastic cover slidably in contact with the lower end of the display. An upside of the elastic cover has two groups of raised parallel lines crossing diagonally to each other to form a square mesh, and bearings of the two raised line groups are symmetrical based on the direction defined by the movement of the lower end of the display.

According to this structure, the appearance of the display unit benefits from a reduced gap between the lower end of the display and the elastic cover. Further, the lower end of the display slides on the elastic cover in contact with points on top of the raised lines thereon with low friction, and thus the tilting movement of the display is smooth. Furthermore, flow of a liquid between the front part and the back part of the tilted bottom surface of the concave portion divided by the lower end of the display is not obstructed because of the mesh of the raised lines, and thus the spilt liquid on the front surface of the display flows from the front part to the back part at the bottom of the concave portion through the convex/concave structure formed by the mesh of the raised lines. The spilt liquid is then drained away through the drain portion. Therefore, the lower end of the display slidably in contact with the raised lines does not prevent drainage of the liquid and benefits the appearance of the display unit at the same time.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

The first embodiment of the present invention is described with reference to the drawings.

Figure 6:
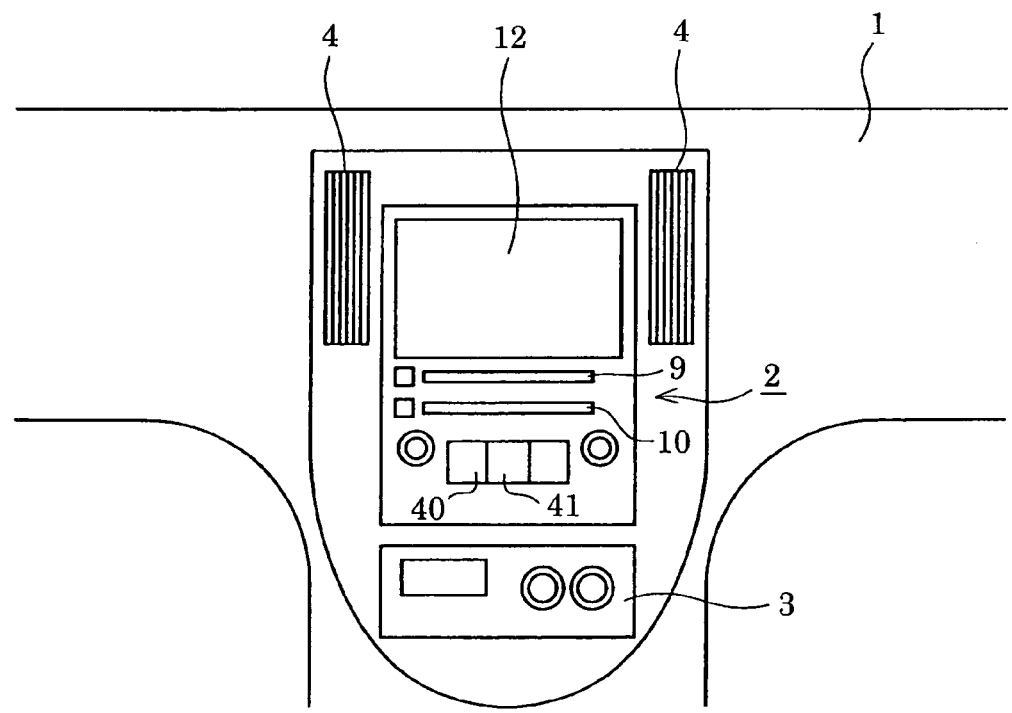
FIG. 6 is a front view of the instrument panel.

A display 12 for a car navigation system 2 is disposed in the center of the instrument panel 1, or in the middle of a driver's seat and a passenger's seat, as shown in FIG. 6. There are other devices disposed on the instrument panel 1. That is, an operation panel of an air-conditioner is disposed under the car navigation system 2, and two outlets 4, 4 of a conditioned air are disposed on both sides of the car navigation system 2.

Figure 1:
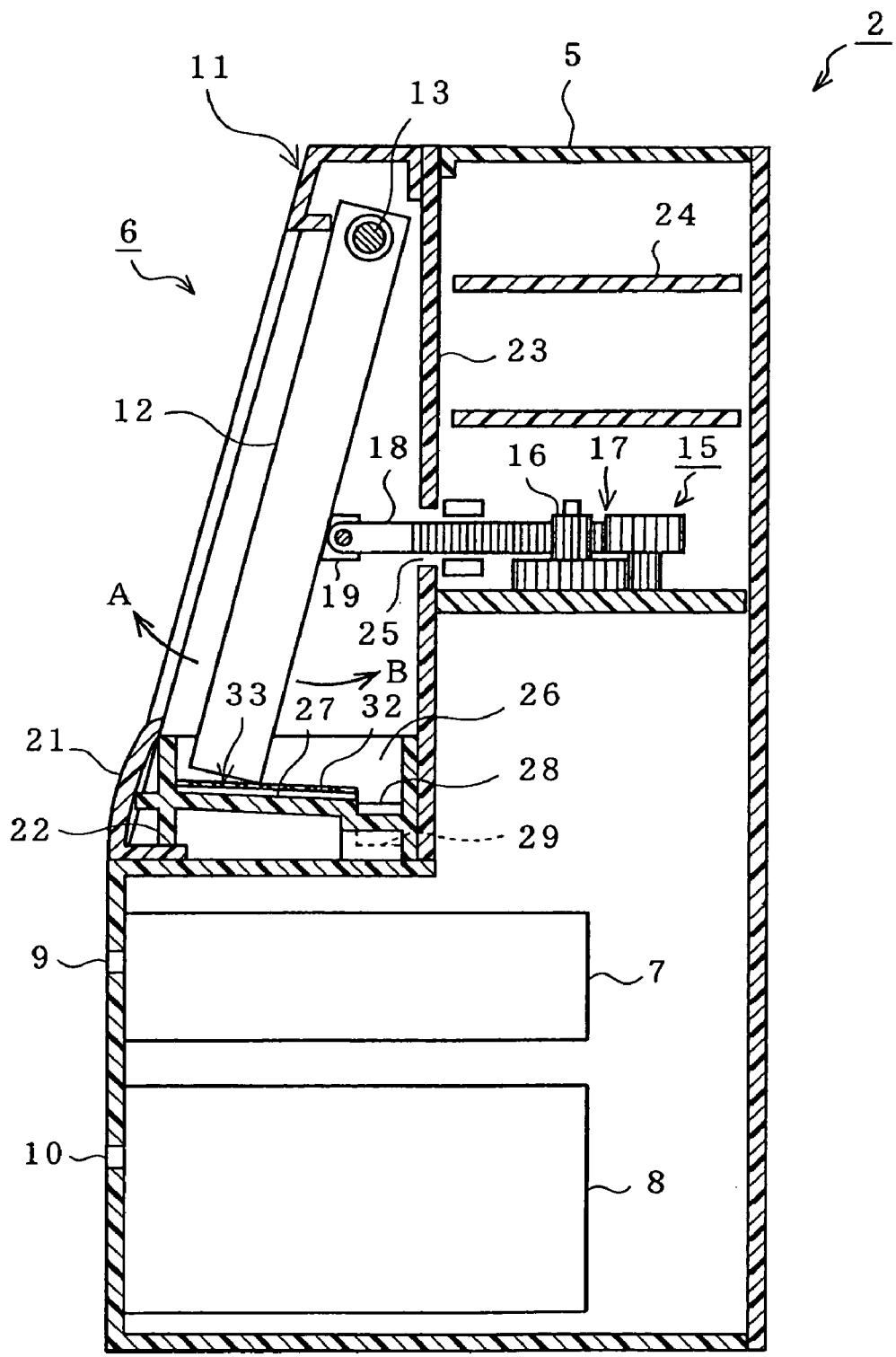
FIG. 1 is a cross-sectional vertical side view according to the first embodiment of the present invention.

The car navigation system 2 is formed in one part with a car stereo system. As shown in FIG. 1, a main body 5 of the navigation system 2 accommodates a display unit 6 in an upper portion, with a DVD drive 7 for a map data storage and a CD player 8 for a car stereo system installed underneath. There are two openings 9 and 10 arranged vertically on a front face of the main body 5. One opening 9, the upper one, is used for inserting a map data DVD-ROM into the DVD drive 7, and the other opening 10, the lower one, is used for inserting a music CD into the CD player 8.

The display unit 6 has a rectangular fixing frame 11 with the display 12 attached thereto. The display 12 uses a liquid crystal panel as a component, and has an axis 13 on the upper end rotatably fixed on the fixing frame by both ends. The display 12 tilts around the axis 13. The display 12 is tilted automatically by a tilt mechanism 15.

Figure 5:
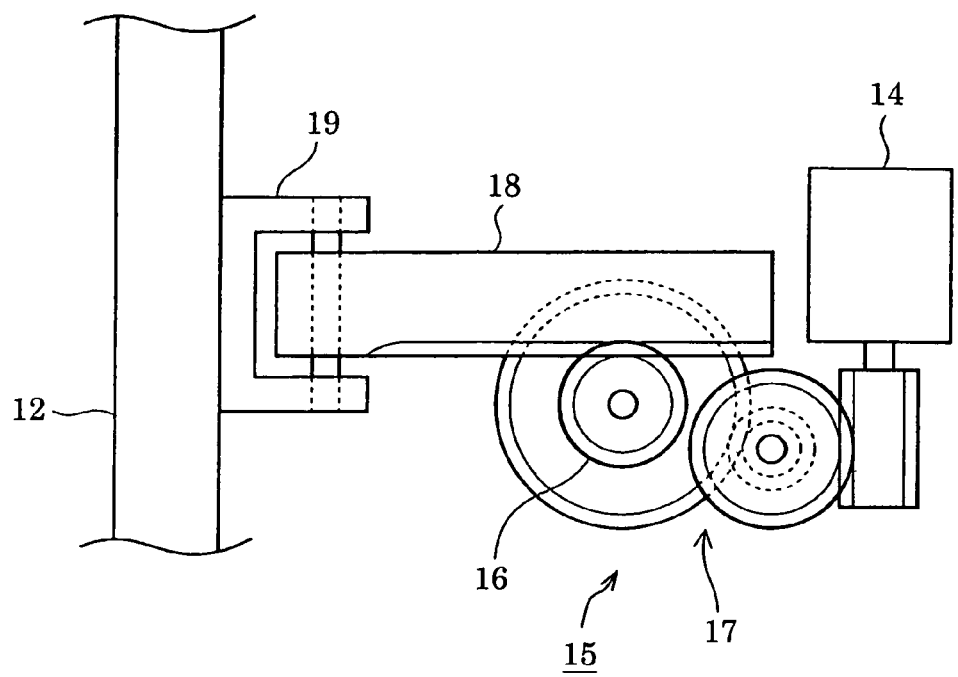
FIG. 5 is a schematic top view of the tilt mechanism of the display unit.

The tilt mechanism 15, as shown in FIG. 5, includes a motor 14, a reduction gearbox 17 that transfers torque from the motor 14 to a pinion 16 with reduced rate, and a rack 18 that converts a rotation to a linear movement. The motor 14 and the reduction gearbox 17 combined with the pinion 16 are disposed on the main body 5, and the rack 18 is slidably supported by a rail (not shown in FIGS.) on the main body 5. The rack 18 engages the pinion 16 with one end connected vertically rotatably to a bracket 19 on the back of the display 12. A rotation of the motor 14 in the tilt mechanism 15 is transferred to the pinion 16 with reduced rotation rate, and the pinion 16 drives the rack 18 linearly back and forth by torque from the rotation of the motor 14. The linear movement of the rack 18 tilts the display 12 around the axis 13.

As shown in FIG. 6, push-button switches 40 and 41 on the lower front face of the main body 5 are used for operating the motor 14. The switches 40 and 41 operate the motor 14 in reverse to each other, that is, for example, one switch 40 is for a clockwise rotation, and the other switch 41 is for a counter-clockwise rotation. The display 12 is thus tilted to either of the two directions A or B as shown in FIG. 1 based on the operation of the switches 40 and 41. The tilt angle of the display 12 can be adjusted by releasing the switches 40 or 41 when the angle is right.

The fixing frame 11 for the display 12 has two parts, that is, a rectangular main frame portion 21 that has upper/lower/right/left members formed in one part, and a concave tray portion 22 formed on the back of the lower member of the frame 11. A backside of the fixing frame 11 is covered by a backboard 23. The upper inside area of the main body 5 contains a circuit board 24 where a control circuit for the navigation system, the car stereo system and the like are disposed. The backboard 23 has a hole 25 for a cable (not shown in FIGS.) that connects the board 24 and the display 12, and the rack 18.

Figure 3:
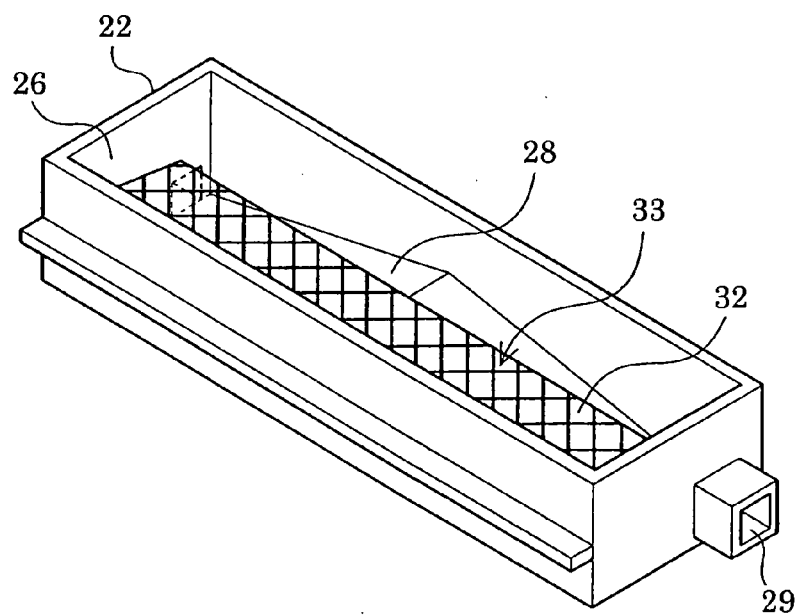
FIG. 3 is a perspective view of the concave portion.

The main frame portion 21 and the tray portion 22 of the fixing frame 11 are both made of plastic. The tray portion 22 is in a horizontally long container shape as shown in FIG. 3. The tray portion 22 formed in a concave tray shape on the back of the lower member of the fixing frame 11 works as a concave portion 26 to contain the lower end of the display 12.

Figure 2:
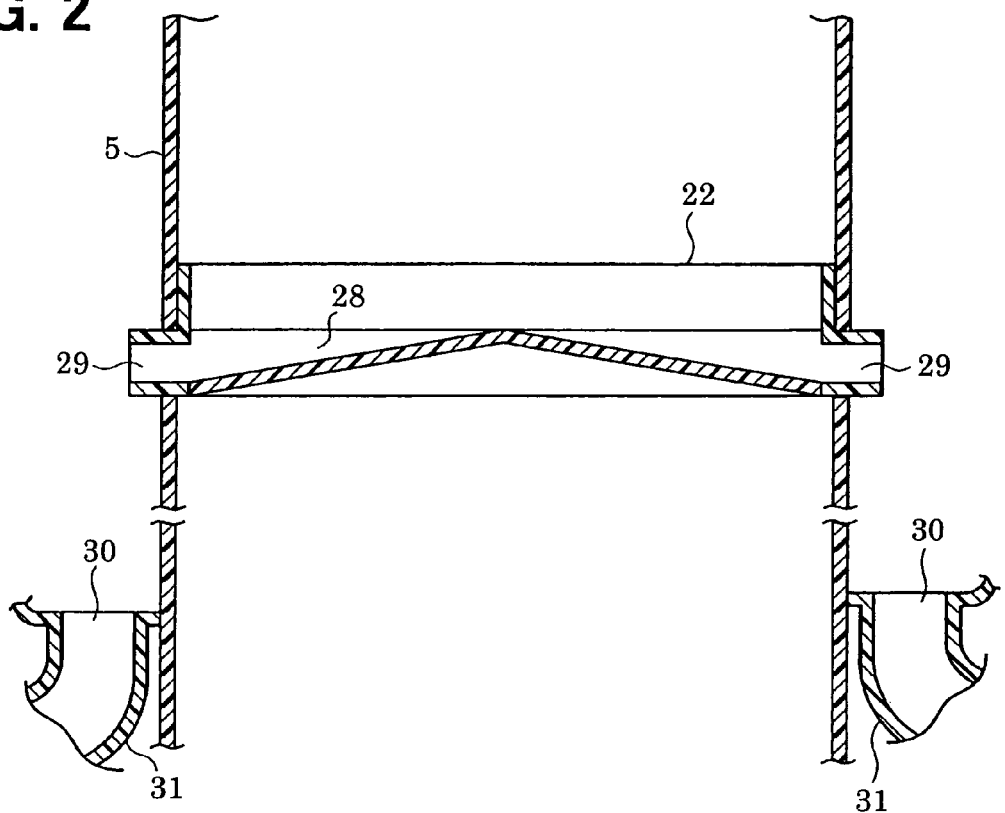
FIG. 2 is a cross-sectional front view along the gutter portion.

At the bottom of the concave portion 26, a front portion that extends from the front end of the concave portion 26 to the proximity of the back end is formed as an inclined plane 27 that lowers towards the back end of the concave portion 26. A gutter 28 is formed on the lowered back end of the inclined plane 27. The gutter 28, as shown in FIG. 2, forms two slopes with its center as the highest point inclined towards both sides in the longitudinal direction. Drains 29, 29 being connected to the gutter 28 are disposed on the backsides of both of the right and left walls of the tray portion 22 as drain portions. The drains 29, 29 protrude from the outer surface of the tray portion 22, and heads of the protruding drains 29 are disposed above holes 30, 30 formed on the instrument panel 2. Pipes 31, 31 being connected to the holes 30, 30 have the other ends lowered and disposed open to the outside of the vehicle.

Figure 4A:
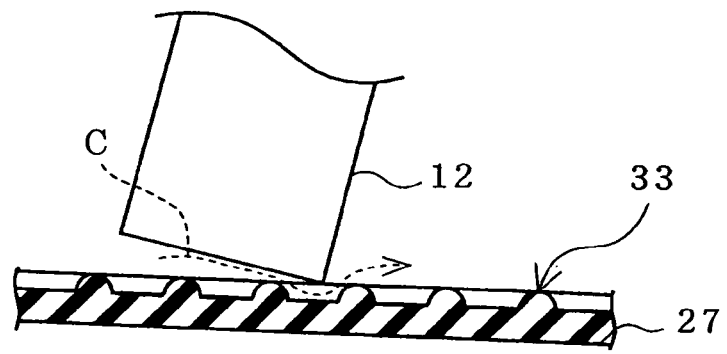
FIG. 4A is a side view of the elastic cover of the bottom of the concave portion and the bottom portion of the display unit.
Figure 4B:
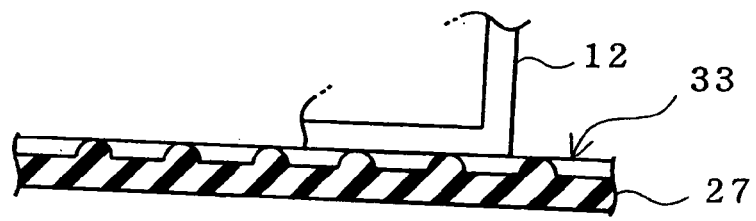
FIG. 4B is a front view of the elastic cover of the bottom of the concave portion and the bottom portion of the display unit.

The inclined plane 27 of the tray portion 22 has a cover 32 that is fixedly placed on the plane 27. The cover 32 is made of an elastic material, for example, a rubber. An upper surface of the cover 32, as shown in FIG. 3 and FIG. 4A, has raised lines that form a mesh. The raised lines 33 are grouped into two kinds, that is, two groups of parallel lines 33a and 33b diagonally aligned to the movement of the display 12. In other words, the two groups of lines extend symmetrically diagonal based on the direction defined by the movement of the display 12, crossing each other to form a mesh. Therefore, the display 12 moves back and forth with the bottom edge slidably touching the raised lines 33a and 33b as shown in FIG. 4A and FIG. 4B. This structure benefits the appearance of the display unit 6, because the gap between the bottom of the display 12 and the cover 32 is minimized.

Figure 4C:
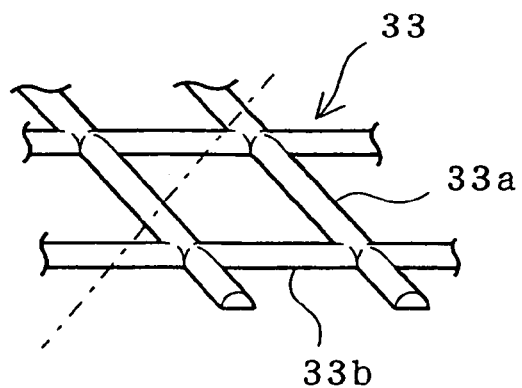
FIG. 4C is a perspective view of the raised lines on the bottom of the concave portion.

The lower end of the tilted display 12 touches the raised lines 33a and 33b, in most cases at the back edge of the bottom surface to be viewable by occupants in the driver's seat and the passenger's seat, as shown in FIG. 4A. The dashed line in FIG. 4C represents an example of the back edge of the bottom surface of the display 12. Each square depression formed by two pairs of parallel raised lines 33a and 33b is diagonally touched by the back edge of the bottom surface of the display 12. That is, a liquid can flow through a space beneath the edge of the display 12 from the front part to the back part as indicated by the dotted line C in FIG. 4A.

The structure described above benefits the display 12 for drainage in the following situation. When the vehicle is moving with a passenger drinking a cup of drink such as a coffee or a tea, a sudden stop of the vehicle causes a spill of the drink from the cup. The spilt drink covers the front surface of the display 12. The drink flows down into the concave portion 26 of the tray portion 22.

The spilt drink in the concave portion 26 further flows down toward the back end on the elastic cover 32 of the bottom surface, because the bottom surface is formed as an inclined plane 27. The bottom edge of the display 12 that touches the raised lines 33a and 33b on the cover 32 does not prevent the spilt drink from flowing towards the back part because of the space beneath the bottom edge of the display 12 secured by the raised lines 33a, 33b. The spilt drink further flows down the gutter 28 to flow into the hole 30 from the drain 29. The spilt drink runs down the pipe 31 to the outside of the vehicle.

In the present embodiment, the lower end of the display 12 protected from being immersed in a liquid collected in the concave portion 26 on the fixing frame 11, because the liquid in the concave portion 26 drains away smoothly from the drain 29 in an occasion such as a drink being spilt over the display 12 or the like.

The bottom of the concave portion 26 being formed as the inclined plane 27 and the gutter 28 being formed as a slope towards the drain 29 have a benefit in terms of draining a large amount of liquid smoothly.

Although the present invention has been fully described in connection with the preferred embodiments thereof with reference to the accompanying drawings, it is to be noted that various changes and modifications will become apparent to those skilled in the art. Examples of such changes follow.

The tray portion 22 and the fixing frame 11 may be formed in one part.

The concave portion 26 may incline towards the front end, or sideways (right/left).

The hole 30 may be disposed in the bottom surface of the gutter 28.

The base of the concave portion 26 may or may not be inclined, and the drain 29 may be disposed at the bottom of the concave portion 26.

The axis for tilting the display 12 may be disposed in a portion other than the upper end of the display 12.

Tilt of the display 12 may be caused by an operation other than the rotation.

The present invention may be applied to different types of automotive systems other than the car navigation system as long as the device has a display.

The display 12 may not include a liquid crystal panel.

Such changes and modifications are to be understood as being within the scope of the present invention as defined by the appended claims.

What is claimed is:

1. A display unit comprising:
   a fixing frame; and
   a display tiltably disposed inside the fixing frame in an automotive vehicle, wherein:
      the fixing frame has a concave portion formed on a lower inside area thereof to contain a lower end of the display; and
      a drain portion is formed in the concave portion for draining a liquid from the concave portion;
      the fixing frame has an inclined surface formed at the bottom of the concave portion such that the inclined surface inclines towards one side of the bottom;
      the drain portion is formed at a lower end of the inclined surface;
      the fixing frame has a gutter portion formed on the lower end of the inclined surface; and
      the gutter portion is connected to the drain portion.

2. A display unit comprising:
   a fixing frame; and
   a display tiltably disposed inside the fixing frame in an automotive vehicle, wherein:
      the fixing frame has a concave portion formed on a lower inside area thereof to contain a lower end of the display;
      a drain portion is formed in the concave portion for draining a liquid from the concave portion;
      the fixing frame has an inclined surface formed at the bottom of the concave portion such that the inclined surface inclines towards one side of the bottom;
      the drain portion is formed at a lower end of the inclined surface;
      the inclined surface lowers towards a back end of the display unit;
      the display is disposed rotatably on an axis fixed at an upper portion of the fixing frame;
      the inclined surface at the bottom of the concave portion has an elastic cover slidably in contact with the lower end of the display;
      the elastic cover has, on an upside thereof, two groups of raised lines diagonally crossing each other to form a mesh; and
      the two groups of raised lines have angles being symmetrically diagonal based on an orientation defined by the movement of the lower end of the display.

3. A display unit comprising:
   a fixing frame with a tray at a lower end thereof; a display disposed on the fixing frame;
   an elastic cover having a concave disposed at a bottom of the tray; and
   a drain for draining a liquid from the tray, wherein
      the tray accommodates a lower end of the display,
      the elastic cover secures a space between the lower end of the display and the bottom of the tray, and
      the elastic cover closes a gap between the lower end of the display and the bottom of the tray.

4. The display unit of claim 3, wherein the bottom of the tray inclines towards a back of the display unit.

5. The display unit of claim 3, wherein the drain is disposed at the bottom of the tray.

* * * * *